United States Patent Office 3,184,422
Patented May 18, 1965

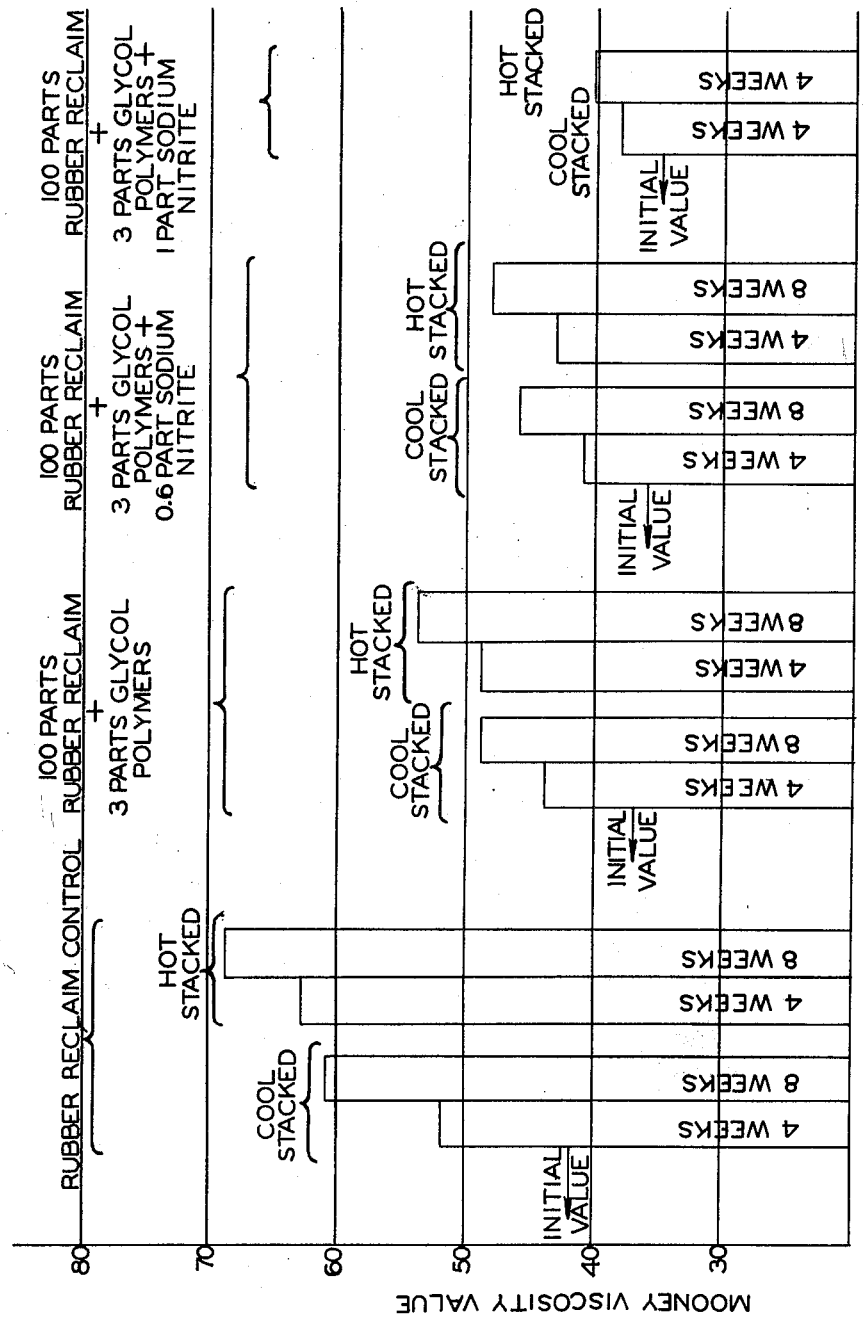

3,184,422
RETARDING THE INCREASE IN VISCOSITY OF RECLAIMED RUBBER WITH SODIUM NITRITE
Ree Vilma le Beau Meyer, Frontenac, Mo., assignor to Midwest Rubber Reclaiming Company, East St. Louis, Ill., a corporation of Delaware
Filed May 10, 1961, Ser. No. 109,188
11 Claims. (Cl. 260—2.3)

This invention relates to improvements in the production of rubber reclaim and more particularly to a novel method for retarding the increase in viscosity of rubber reclaims.

Briefly, the present invention is directed to the method of retarding the growth of Mooney viscosity values in reclaimed rubber which comprises incorporating certain materials into said rubber.

Reclaimed rubber when stored and in particular when stored at elevated temperatures decreases in plasticity or increases in viscosity. This detracts from the usefulness of the product and may even eventually require reprocessing of the reclaim. This phenomenon is generally known in the trade and is called growth of Mooney viscosity, the "Mooney" viscosity measurement being an accepted measure of the plasticity of rubber reclaim.

Among the several objects of the invention may therefore be noted the provision of a method for effectively and substantially retarding the increase in Mooney viscosity values of rubber reclaims; the provision of such a method which may be conveniently utilized in conjunction with any of the conventional reclaiming processes; the provision of a method of this character which may be applied to various types of rubber reclaims consisting in whole or in part of natural rubber, butadiene-styrene type rubbers or mixtures thereof; the provision of a method of this type which permits rubber reclaim products treated thereby to be stored for longer periods of time than was possible heretofore without affecting the usefulness thereof; and the provision of such a method which is simple and economical. Other objects and features will be in part apparent and in part pointed out hereinafter.

The invention accordingly comprises the methods hereinafter described, the scope of the invention being indicated in the following claims.

The accompanying drawing graphically illustrates the results of tests carried out in accordance with the present invention, which tests will be described in detail hereinafter.

As is known, an important characteristic of a finished rubber reclaim product is viscosity or plasticity, as determined by the Mooney viscosity or plasticity test (see Industrial and Engineering Chemistry, vol. 26, page 147, 1934). This method of testing viscosity is well known to those skilled in the art and various types of rubber reclaim products may exhibit Mooney viscosity values ranging, for example, from about 20 to about 80 (at 212° F.). The finished rubber reclaim product resulting from a conventional rubber reclaiming process may have a temperature of from about 100° F. to about 160° F. and a relatively low viscosity value. Upon aging and cooling of the product to 74° F. (i.e., room temperature), the Mooney viscosity value increases or grows and eventually attains a fairly constant level. This phenomenon, which makes the rubber reclaim more viscous or less plastic, is particularly noticeable with rubber reclaims consisting in whole or in part of natural rubber, butadiene-styrene type rubbers or mixtures thereof which constitute the more important commercial class of rubber reclaims.

It has been recognized that if the product is in slab form and is "cool stacked" (i.e., cooled to 74° F. and maintained at this temperature) rather than "hot stacked" (i.e., stacked at a high temperature, e.g. 140° F., and allowed to cool to room temperature over a period of, say, a week), the growth or increase in Mooney viscosity value takes place more slowly but eventually reaches the same level as that of the "hot stacked" rubber reclaim. Since the increase in Mooney viscosity value may render the use of the rubber reclaim product objectionable for certain purposes and since this increase in viscosity places limitations upon the length of time for which the rubber reclaim may be stored prior to use, it is desirable to effectively retard or control the growth or increase of the Mooney viscosity.

In accordance with the present invention, it has now been found that the growth of Mooney viscosity values in reclaimed rubber may be retarded by incorporating certain materials, more fully described hereinafter, into the reclaim. The incorporation of such materials into the reclaim results in a substantial retardation of the growth of Mooney viscosity values irrespective of whether the reclaim is "hot stacked" or "cool stacked." The present invention has been found to be effective in retarding the growth of Mooney viscosity values in various types of natural rubber reclaims consisting in whole or in part of natural rubber, butadiene-styrene type rubbers or mixtures thereof which, as previously mentioned, constitute the most important class of rubber reclaims from the commercial standpoint.

The materials which have been found effective in retarding the growth of Mooney viscosity values include glycol polymers, glycol bottoms, diethylene glycol (either crude or pure), sodium nitrite and mixtures of sodium nitrite and diethylene glycol and sodium nitrite and glycol polymers. The term "glycol polymers" designates a mixture of monoethylene glycol, diethylene glycol, triethylene glycol, tetraethylene glycol and a condensation of various glycols, and having the following properties: specific gravity (at 60° F.), 1.180; distillation range, 390° F. to 580° F.; recovery at 760 mm., atmospheric pressure, approximately 65%. This product (commercially available from G. S. Robins & Co.) is black in color, and contains approximately 40% high molecular weight glycols. The term "glycol bottoms" designates a mixture consisting of 0.5% by weight of monoethylene glycol, 84.0% by weight of diethylene glycol, 10.5% by weight of triethylene glycol and 5.0% by weight of inerts and having the following properties: boiling range, 220–290° C., specific gravity, 1.1–1.15. The above described materials may be incorporated into the rubber reclaim in varying amounts, but preferably should not exceed 10% by weight based upon the weight of the reclaim or based upon the weight of the rubber scrap where the material is added to the reclaiming mixture.

The method of the present invention may be conveniently carried out in conjunction with any of the conventional rubber reclaiming processes (such as those described in Industrial and Engineering Chemistry, vol. 43, pages 250–256, 1951) using conventional reclaiming agents, etc. In general, the retarding agents enumerated above, along with standard compounding ingredients, may be conveniently mixed with the rubber reclaim produced by one of the conventional rubber reclaiming processes and the resulting mixture is then milled and/or refined in accordance with conventional practice. If desired, the retarding agent can be added directly to the reclaiming mix (i.e., the mixture of rubber scrap, reclaiming agents, etc.) where the heater reclaiming process or mechanical reclaiming process is employed. However, where the digester reclaiming process is employed, the retarding agent must be added to the reclaim after reclaiming and prior to milling and/or refining since the retarding agents, being water-soluble, would otherwise be washed out during the course of the reclaiming process. When sodium nitrite is used as the retarding agent in accordance with the invention, it should be incorporated into the reclaim subsequent to reclaiming and prior to milling and/or refining as described above.

It will be understood that the method of the invention is applicable to rubber reclaims of any form including slab, pellet, powder and bale.

The following examples illustrate the invention:

*Example 1*

A series of tests were carried out utilizing whole tire rubber reclaim produced by the conventional digester process. The reclaim consisted of a mixture of natural rubber and a butadiene-styrene type rubber.

In the first test, two samples of the reclaim were milled in accordance with conventional milling procedures to produce slabs. The Mooney viscosity of each sample was then determined. The slabs constituting one of the samples were next "cool stacked," i.e., cooled to 74° F. and maintained at this temperature, and the Mooney viscosity was again measured after a lapse of four weeks and eight weeks, respectively. The slabs constituting the other sample were "hot stacked," i.e., placed in an oven at 140° F. and cooled down to 74° F. over a period of one week. The Mooney viscosity of the second sample was also measured after a lapse of four weeks and eight weeks, respectively.

In the second test, the above described procedure was repeated except that 3 parts by weight of glycol polymers were added to each 100 parts by weight of the reclaim prior to milling.

In the third test, the above described procedure was repeated except that 3 parts by weight of glycol polymers and 0.6 part by weight of sodium nitrite were added to each 100 parts by weight of the reclaim prior to milling.

In the fourth test, the above described procedure was also repeated except that 3 parts by weight of glycol polymers and 1 part by weight of sodium nitrite were added to each 100 parts by weight of the reclaim prior to milling and the Mooney viscosity values were not measured after eight weeks.

The results of these tests are graphically illustrated in the accompanying drawing.

As shown, in the first test, the untreated or control reclaim had an initial Mooney viscosity value of approximately 42. After four weeks, the Mooney value of the "cool stacked" sample had risen to 52, and after eight weeks, to 61. The Mooney value of the "hot stacked" sample, after four weeks, had risen to 63, and after eight weeks, to 68.

In the second test, the initial Mooney viscosity value of the treated samples was approximately 37. After four weeks, the Mooney value of the "cool stacked" sample had risen to approximately 44, and after eight weeks, to 49. The Mooney value of the "hot stacked" sample, after four weeks, had risen to approximately 49, and after eight weeks, to about 54.

In the third test, the initial Mooney viscosity value of the samples was approximately 36. After four weeks, the Mooney value of the "cool stacked" sample had risen to 41, and after eight weeks, to 46. The Mooney value of the "hot stacked" sample, after four weeks, had risen to 43, and after eight weeks, to 48.

In the fourth test, the initial Mooney value of the samples was 35. After four weeks, the Mooney value of the "cool stacked" sample had risen to 38, and the Mooney value of the "hot stacked" sample had risen to 40.

*Example 2*

A whole tire rubber reclaim produced by the conventional heater process was employed. The reclaim consisted of a mixture of natural rubber and a butadiene-styrene type rubber.

Two samples of the reclaim were milled in accordance with conventional milling procedures to produce slabs. The Mooney viscosity value of each sample was determined, after which the slabs constituting one of the samples were "cool stacked," i.e., cooled to 74° F. and maintained at this temperature, and the slabs constituting the other sample were "hot stacked," i.e., placed in an oven at 100° C. and maintained at this temperature.

After a lapse of thirteen weeks, the Mooney viscosity value of each sample was determined and it was found that the Mooney value of the "cool stacked" sample had increased by an increment of 25 and that of the "hot stacked" sample had increased by an increment of 50.

The above described procedure was repeated except that 3 parts by weight of crude diethylene glycol were added to each 100 parts by weight of the reclaim prior to milling. After thirteen weeks, it was found that the Mooney viscosity value of the "cool stacked" sample had increased by an increment of 17 and that of the "hot stacked" sample by an increment of 36.

The above described procedure was repeated except that 3 parts by weight of diethylene glycol and 0.3 part by weight of sodium nitrite were added to each 100 parts by weight of the reclaim prior to milling. After thirteen weeks, it was found that the Mooney viscosity value of the "cool stacked" sample had increased by an increment of 18 and that of the "hot stacked" sample by an increment of 33.

The above described procedure was repeated except that 3 parts by weight of diethylene glycol and 0.6 part by weight of sodium nitrite were added to each 100 parts by weight of the reclaim prior to milling. After thirteen weeks, it was found that the Mooney viscosity value of the "cool stacked" sample had increased by an increment of 12 and that of the "hot stacked" sample by an increment of 30.

The above described procedure was repeated except that 3 parts by weight of diethylene glycol and 1 part by weight of sodium nitrite were added to each 100 parts by weight of reclaim prior to milling. After thirteen weeks, it was found that the Mooney viscosity value of the "cool stacked" sample had increased by an increment of 7 and that of the "hot stacked" sample by an increment of 19.

The above described procedure was repeated except that 5 parts by weight of diethylene glycol and 0.5 part by weight of sodium nitrite were added to each 100 parts by weight of reclaim prior to milling. After thirteen weeks, it was found that the Mooney viscosity value of the "cool stacked" sample had increased by an increment of 10 and that of the "hot stacked" sample by an increment of 13.

The above described procedure was repeated except that 5 parts by weight of diethylene glycol were added to each 100 parts by weight of reclaim prior to milling. After thirteen weeks, it was found that the Mooney viscosity value of the "cool stacked" sample had increased by an increment of 9 and that of the "hot stacked" sample by an increment of 22.

The above described procedure was again repeated except that 5 parts by weight of glycol polymers were added to each 100 parts by weight of reclaim prior to milling. After thirteen weeks, it was found that the Mooney viscosity value of the "cool stacked" sample had increased by an increment of 8 and that of the "hot stacked" sample by an increment of 22.

*Example 3*

A fiber-free whole tire rubber reclaim produced by the conventional mechanical process was employed. The reclaim consisted of a mixture of natural rubber and a butadiene-styrene type rubber.

Two samples of the reclaim were milled and refined in accordance with conventional procedures to produce slabs. The Mooney viscosity value of each sample was determined, after which the slabs constituting one of the samples were "cool stacked," i.e., cooled to 74° F. and maintained at this temperature, and the slabs constituting the other sample were "hot stacked," i.e., placed in an oven at 100° F. and maintained at this temperature.

After a lapse of thirteen weeks, the Mooney viscosity value of each sample was determined, and it was found that the Mooney viscosity value of the "cool stacked" sample had increased by an increment of 25 and that of the "hot stacked" sample had increased by an increment of 52.

The above described procedure was repeated except that 10 parts by weight of sodium nitrite were added to each 100 parts by weight of the reclaim prior to milling and refining. After thirteen weeks, it was found that the Mooney viscosity value of the "cool stacked" sample had increased by an increment of 8 and that of the "hot stacked" sample by an increment of 26.

The above described procedure was repeated except that 5 parts by weight of diethylene glycol were added to each 100 parts by weight of the reclaim prior to milling and refining. After thirteen weeks, it was found that the Mooney viscosity value of the "cool stacked" sample had increased by an increment of 14 and that of the "hot stacked" sample by an increment of 33.

*Example 4*

A natural rubber reclaim produced by the conventional digester process was employed.

Two samples of the reclaim were milled in accordance with conventional milling procedures to produce slabs. The Mooney viscosity value of each sample was determined, after which the slabs constituting one of the samples were "cool stacked," i.e., cooled to 74° F. and maintained at this temperature, and the slabs constituting the other sample were "hot stacked," i.e., placed in an oven at 100° F. and maintained at this temperature.

After a lapse of thirteen weeks, the Mooney viscosity value of each sample was determined, and it was found that the Mooney viscosity value of the "cool stacked" sample had increased by an increment of 37 and that of the "hot stacked" sample had increased by an increment of 62.

The above described procedure was repeated except that 10 parts by weight of sodium nitrite were added to each 100 parts by weight of the reclaim prior to milling. After thirteen weeks, it was found that the Mooney viscosity value of the "cool stacked" sample had increased by an increment of 16 and that of the "hot stacked" sample by an increment of 47.

The above described procedure was repeated except that five parts by weight of diethylene glycol were added to each 100 parts by weight of reclaim prior to milling. After thirteen weeks, it was found that the Mooney viscosity value of the "cool stacked" sample had increased by an increment of 15 and that of the "hot stacked" sample by an increment of 28.

*Example 5*

A rubber reclaim made from tread buffing stock and consisting of a butadiene-styrene type rubber was employed. The material had been reclaimed by the heater process.

Two samples of the reclaim were milled in accordance with conventional milling procedure to produce slabs. The Mooney viscosity value of each sample was determined, after which the slabs constituting one of the samples were "cool stacked," i.e., cooled to 74° F. and maintained at this temperature, and the slabs constituting the other sample were "hot stacked," i.e., placed in an oven at 100° F. and maintained at this temperature.

After a lapse of thirteen weeks, the Mooney viscosity value of each sample was determined, and it was found that the Mooney viscosity value of the "cool stacked" sample had increased by an increment of 20 and that of the "hot stacked" sample had increased by an increment of 38.

The above described procedure was repeated except that 10 parts by weight of sodium nitrite were added to each 100 parts by weight of the reclaim prior to milling. After thirteen weeks, it was found that the Mooney viscosity value of the "cool stacked" sample had increased by an increment of 8 and that of the "hot stacked" sample by an increment of 28.

The above described procedure was repeated except that 5 parts by weight of diethylene glycol were added to each 100 parts by weight of the reclaim prior to milling. After thirteen weeks, it was found that the Mooney viscosity value of the "cool stacked" sample had increased by an increment of 8 and that of the "hot stacked" sample by an increment of 21.

In each of the above examples, the Mooney viscosity value was determined in accordance with the procedure of ASTM D1646–59T at 212° F., 3 minutes and using the large rotor.

In view of the above, it will be seen that the several objects of the invention are achieved and other advantageous results attained.

As various changes should be made in the above methods without departing from the scope of the invention, it is intended that all matter contained in the above description or shown in the accompanying drawing shall be interpreted as illustrative and not in a limiting sense.

I claim:

1. The method of retarding the increase in viscosity of reclaimed rubber selected from the group consisting of natural rubber, a butadiene-styrene rubber and mixtures thereof, which comprises incorporating into said rubber not more than approximately 10% by weight, based upon the weight of the rubber, of a material selected from the group consisting of sodium nitrite; a mixture of diethylene glycol and sodium nitrite; and a mixture of glycol polymers and sodium nitrite.

2. The method of retarding the increase in viscosity of reclaimed rubber selected from the group consisting of natural rubber, a butadiene-styrene rubber and mixtures thereof, which comprises incorporating into said rubber approximately 10 parts by weight of sodium nitrite per 100 parts by weight of rubber.

3. The method of retarding the increase in viscosity of reclaimed rubber selected from the group consisting of natural rubber, a butadiene-styrene rubber and mixtures thereof, which comprises incorporating into said rubber approximately 3 parts by weight of diethylene glycol and not more than approximately 1 part by weight of sodium nitrite per 100 parts by weight of rubber.

4. The method of retarding the increase in viscosity of reclaimed rubber selected from the group consisting of natural rubber, a butadiene-styrene rubber and mixtures thereof, which comprises incorporating into said rubber approximately 5 parts by weight of diethylene glycol and not more than approximately 1 part by weight of sodium nitrite per 100 parts by weight of rubber.

5. The method of retarding the increase in viscosity of reclaimed rubber selected from the group consisting of natural rubber, a butadiene-styrene rubber and mixtures thereof, which comprises incorporating into said rubber approximately 3 parts by weight of glycol polymers and not more than approximately 1 part by weight of sodium nitrite per 100 parts by weight of rubber.

6. The method of retarding the increase in viscosity of reclaimed rubber selected from the group consisting of natural rubber, a butadiene-styrene rubber and mixtures thereof, which comprises incorporating into said rubber prior to milling thereof a material selected from the group consisting of sodium nitrite; a mixture of diethylene glycol and sodium nitrite; and a mixture of glycol polymers and sodium nitrite.

7. The method of retarding the increase in viscosity of reclaimed rubber selected from the group consisting of natural rubber, a butadiene-styrene rubber and mixtures thereof, which comprises incorporating into said rubber prior to milling thereof not more than approximately 10% by weight, based upon the weight of the rubber, of a material selected from the group consisting of sodium nitrite; a mixture of diethylene glycol and sodium nitrite; and a mixture of glycol polymers and sodium nitrite.

8. The method of retarding the increase in viscosity of reclaimed rubber selected from the group consisting of natural rubber, a butadiene-styrene rubber and mixtures thereof, which comprises incorporating into said rubber prior to milling thereof approximately 10 parts by weight of sodium nitrite per 100 parts by weight of rubber.

9. The method of retarding the increase in viscosity of reclaimed rubber selected from the group consisting of natural rubber, a butadiene-styrene rubber and mixtures thereof, which comprises incorporating into said rubber prior to milling thereof approximately 3 parts by weight of diethylene glycol and not more than approximately 1 part by weight of sodium nitrite per 100 parts by weight of rubber.

10. The method of retarding the increase in viscosity of reclaimed rubber selected from the group consisting of natural rubber, a butadiene-styrene rubber and mixtures thereof, which comprises incorporating into said rubber prior to milling thereof approximately 5 parts by weight of diethylene glycol and not more than approximately 1 part by weight of sodium nitrite per 100 parts by weight of rubber.

11. The method of retarding the increase in viscosity of reclaimed rubber selected from the group consisting of natural rubber, a butadiene-styrene rubber and mixtures thereof, which comprises incorporating into said rubber prior to milling thereof approximately 3 parts by weight of glycol polymers and not more than approximately 1 part by weight of sodium nitrite per 100 parts by weight of rubber.

References Cited by the Examiner
UNITED STATES PATENTS

| | | | |
|---|---|---|---|
| 2,533,017 | 12/50 | Johnson et al. | 260—2.3 |
| 3,065,193 | 11/62 | Volk | 260—45.9 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,184,422                                  May 18, 1965

Ree Vilma le Beau Meyer

It is hereby certified that error appears in the above numbered patent requiring correction and that the said Letters Patent should read as corrected below.

Column 2, line 23, strike out "natural"; column 4, line 6, for "100° C." read -- 100° F. --.

Signed and sealed this 5th day of October 1965.

(SEAL)
Attest:

ERNEST W. SWIDER                                      EDWARD J. BRENNER
Attesting Officer                                          Commissioner of Patents